United States Patent
Hunter et al.

(10) Patent No.: US 7,499,803 B2
(45) Date of Patent: Mar. 3, 2009

(54) SYSTEM AND METHOD FOR CALIBRATING ON-BOARD AVIATION EQUIPMENT

(75) Inventors: Jeffrey K. Hunter, Olathe, KS (US); Manuel F. Richey, Paola, KS (US); Gene L. Field, Tonganoxie, KS (US)

(73) Assignee: Honeywell International Inc., Morristown, NJ (US)

( * ) Notice: Subject to any disclaimer, the term of this patent is extended or adjusted under 35 U.S.C. 154(b) by 486 days.

(21) Appl. No.: 11/351,628

(22) Filed: Feb. 10, 2006

(65) Prior Publication Data

US 2007/0191999 A1 Aug. 16, 2007

(51) Int. Cl.
*G01C 21/00* (2006.01)
*G01C 23/00* (2006.01)

(52) U.S. Cl. .................. 701/213; 701/218; 701/300; 342/357.14; 342/420

(58) Field of Classification Search ............. None
See application file for complete search history.

(56) References Cited

U.S. PATENT DOCUMENTS

| 5,526,001 | A | 6/1996 | Rose et al. |
| 6,208,937 | B1 | 3/2001 | Huddle |
| 6,542,796 | B1 | 4/2003 | Gibbs et al. |
| 6,784,840 | B2 | 8/2004 | Menegozzi et al. |
| 2004/0220722 | A1* | 11/2004 | Taylor ................ 701/200 |

FOREIGN PATENT DOCUMENTS

WO 0002009 A 1/2000

* cited by examiner

*Primary Examiner*—Michael J. Zanelli
(74) *Attorney, Agent, or Firm*—Fogg & Powers LLC

(57) ABSTRACT

A method and system are provided for calibrating on-board aviation equipment. An actual bearing from an aircraft to an automatic direction finder (ADF) station is determined. The aircraft is moved to a plurality of headings. An ADF bearing is determined from the aircraft to the ADF station at each of the plurality of headings. An error between the actual bearing and the ADF bearing at each heading is calculated. Then, an error function as a function of the heading of the aircraft is generated based at least in part on the calculated error.

20 Claims, 5 Drawing Sheets

SYSTEM AND METHOD FOR CALIBRATING ON-BOARD AVIATION EQUIPMENT

TECHNICAL FIELD

The present invention generally relates to an aviation system, and more particularly relates to a method and system for calibrating aviation equipment.

BACKGROUND

One common method used in the navigation of aircraft is known as radio direction finding, in which the direction from the aircraft to a known radio source is determined using an antenna. Presently, many aircraft include automatic direction finders (ADFs) which automatically detect the direction to a particular ADF station using a directional antenna. However, the readings given by ADFs may not be accurate, and as a result, the ADF systems in modern aircraft may need to be regularly calibrated.

Current methods for calibrating an ADF system in an aircraft can be labor intensive and time consuming, and thus, expensive. The most common method for calibrating an ADF system involves initially pointing the aircraft directly at the known location of an ADF station, rotating the aircraft to various bearings, such as every 45 degrees, and noting the error at each bearing. The ADF error, such as quadrantal error, may then be corrected by tuning a potentiometer in the antenna.

However, the antenna is often not easily accessible, and can only be reached by crawling through small access channels within the aircraft. Also, after each adjustment, the entire process must be repeated until the quadrantal error is reduced to an acceptable level. Furthermore, other types of error, besides quadrantal error, can not be corrected.

Accordingly, it is desirable to provide a method and system for calibrating on-board aviation equipment, such as an ADF system, that reduces the amount of labor involved. In addition, it is desirable to provide a method and system for calibrating on-board aviation equipment that corrects for all types of error. Furthermore, other desirable features and characteristics of the present invention will become apparent from the subsequent detailed description and the appended claims, taken in conjunction with the accompanying drawings and the foregoing technical field and background.

BRIEF SUMMARY OF THE INVENTION

A method is provided for calibrating on-board aviation equipment. The method comprises determining an actual bearing from an aircraft to an automatic direction finder (ADF) station, moving the aircraft to a plurality of headings, determining an ADF bearing from the aircraft to the ADF station at each of the plurality of headings to which the aircraft is moved, calculating an error between the actual bearing and each of the determined ADF bearings, and generating an error function based at least in part on the calculated errors.

A system is provided for calibrating on-board aviation equipment. The system comprises an aircraft and a computing system on-board the aircraft. The computing system is configured to calculate error between an actual bearing from the aircraft to an ADF station and a plurality of ADF bearings from the aircraft to the ADF station, each ADF bearing being associated with a respective one of a plurality of headings of the aircraft, and generate an ADF error function based at least in part on the calculated error.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

The following detailed description of the invention is merely exemplary in nature and is not intended to limit the invention or the application and uses of the invention. Furthermore, there is no intention to be bound by any theory presented in the preceding background of the invention or the following detailed description of the invention. It should also be understood that FIGS. 1-5 are merely illustrative and may not be drawn to scale.

FIG. 1 to FIG. 5 illustrate a method and system for calibrating on-board aviation equipment. An aircraft is positioned, or oriented, in a first heading or bearing. An actual bearing from the aircraft to an automatic direction finder (ADF) station is then determined. The actual bearing is relative to the nose of the aircraft and may be determined using the heading of the aircraft and a known bearing from the aircraft to the ADF station. In one embodiment, the actual bearing is determined using a Global Positioning Satellite (GPS) system and a navigational database, which includes the latitude and longitude of the ADF station. An "ADF bearing" is then determined using an ADF system on the aircraft by receiving radio signals that are transmitted by the ADF station. The ADF error for the particular heading is then calculated. The ADF error may be the difference between the actual bearing and the ADF bearing. The above information is stored on a memory located within the avionics system on-board the aircraft. The aircraft is then rotated to a second heading, the process is repeated for the second bearing, and the information is again stored onto the memory. The process may be repeated numerous times, as the aircraft is rotated in a complete circle, and after a predetermined number of readings are taken, the avionics system may create a calibration, or error, function as a function of the heading of the aircraft. During operation the avionics system may apply the calibration function to the bearing indicated by the ADF system.

Figure 1:
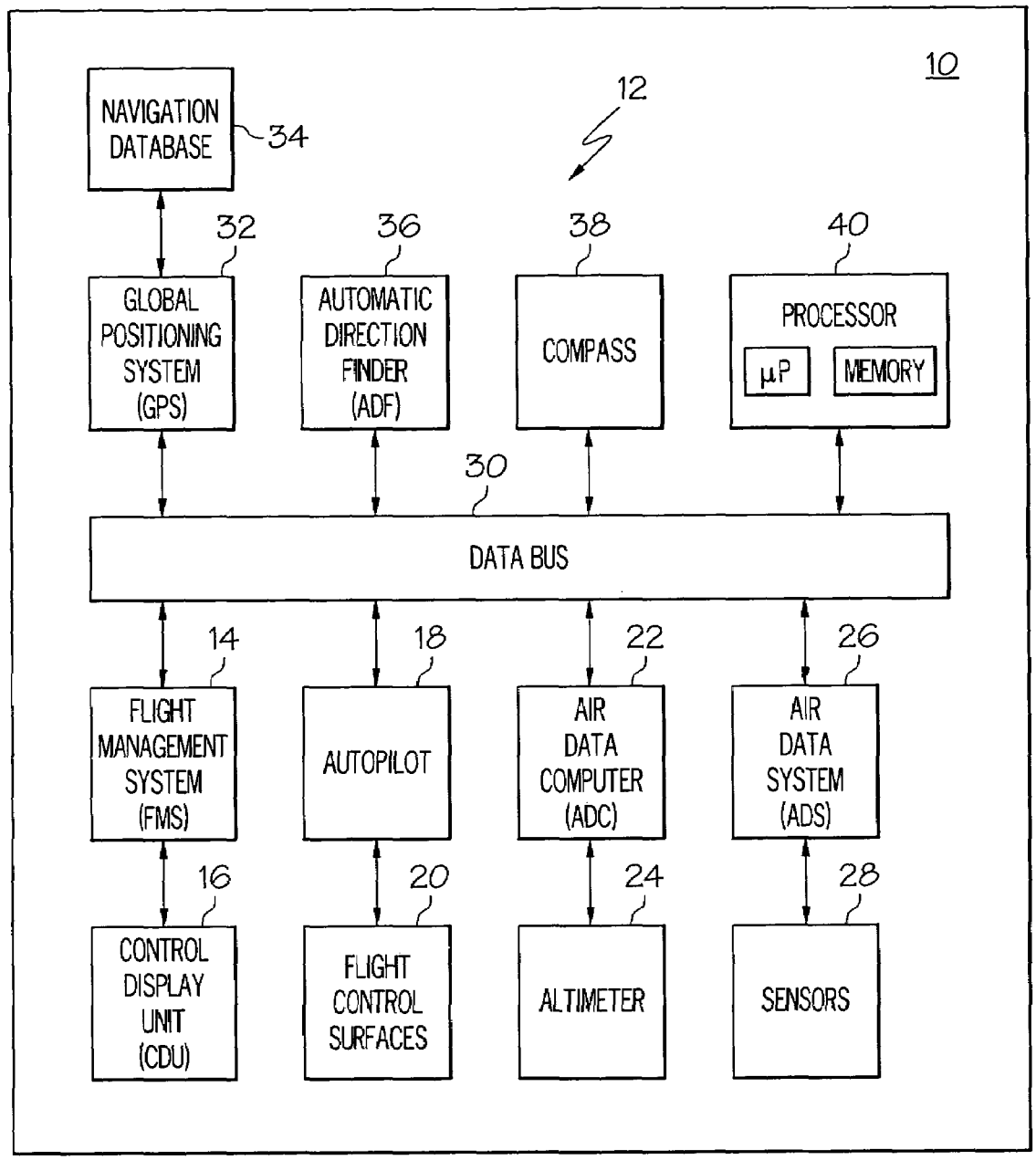
FIG. 1 is block diagram schematically illustrating an aircraft and an avionics system on-board the aircraft.

FIG. 1 schematically illustrates an aircraft 10 with an on-board navigation and control/avionics system 12, according to one embodiment of the present invention. The aircraft 10 may be any one of a number of different types of aircraft such as, for example, a private propeller or jet engine driven airplane, a commercial jet liner, or a helicopter. The system 12 includes a flight management system (FMS) 14, a control display unit (CDU) 16, an autopilot or automated guidance system 18, multiple flight control surfaces 20 (e.g., ailerons, elevators, and a rudder), an Air Data Computer (ADC) 22, an altimeter 24, an Air Data System (ADS) 26, and multiple sensors 28. The system 12 also includes a data bus 30, which operably couples the other components of the system 12. Although not illustrated, the sensors 28 may include a barometric pressure sensor, a thermometer, and a wind speed sensor, and the ADS 26 may include a pitostatic tube system, as is commonly understood in the art.

As illustrated, the system 12 also includes a Global Positioning System (GPS) (or Global Positioning Satellite system), a navigation database 34, an ADF system 36 (including an ADF receiver), a compass 38, and a processor 40, all of which are operably coupled through the data bus 30. The processor 40 further includes a microprocessor and a memory. It should also be understood that although the processor 40 is shown as a separate component of the system 12, the processor 40 may be integrated into one of the other components of the system 12, such as the GPS system 32 or ADF system 36.

Figure 2:
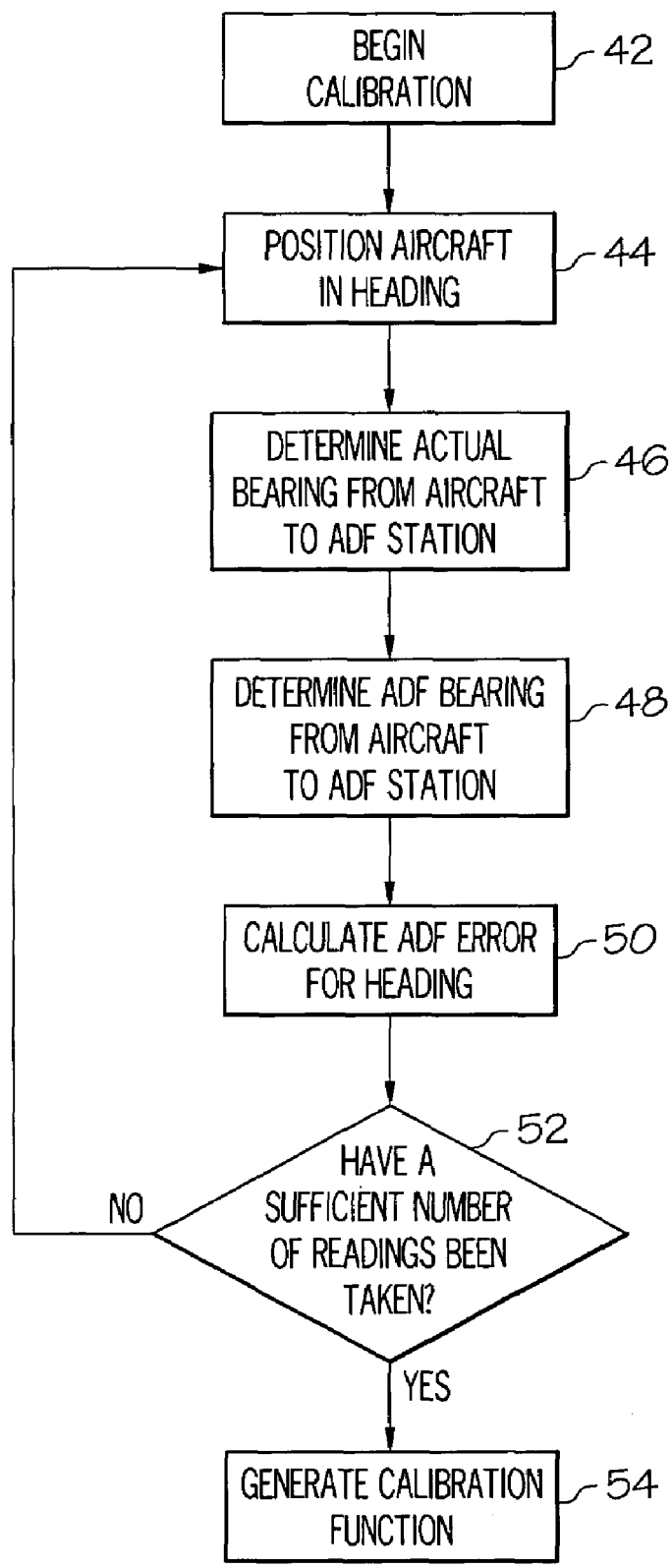
FIG. 2 is a flow chart illustrating a method for calibrating on-board aviation equipment according to one embodiment of the present invention.

FIG. 2 illustrates a method for calibrating the on-board aviation equipment, in particular the ADF system 36, shown in FIG. 1. In this regard, the method may be described in terms of functional block components and various processing steps. However, it should be understood that such functional blocks may be realized by any number of hardware, firmware, and/or instructions stored on a computer readable medium (i.e., software) to be carried out by a computing system (i.e., the system 12 shown in FIG. 1) and may be implemented in whole or in part using electronic components, including various circuitry and integrated circuits, such as an Application Specific Integration Circuit (ASIC), or with instructions stored on a computer readable medium to be carried out by a computing system.

Still referring to FIG. 2, at step 42, the calibration is begun by setting the system to an ADF calibration, or alignment, mode. At step 44, the aircraft is positioned in a first heading. As will be appreciated by one skilled in the art, the heading of the aircraft may be determined by utilizing the compass on-board the aircraft. Then, at step 46, an actual bearing from the aircraft to an ADF station is determined. At step 48, an "ADF bearing" (i.e., as indicated by the on-board ADF system) from the aircraft to the ADF station is determined. Next, at step 50, an ADF error for the particular heading in which the aircraft is positioned is calculated. The ADF error may simply be the difference between the actual bearing and the ADF bearing. Although not specifically illustrated, the current heading and the ADF error associated with the current heading may then be stored in the memory of the processor 40 shown in FIG. 1. At step 52, the determination is made as to whether or not a sufficient (i.e., a pre-set minimum) number of readings have been taken for the calibration. If the minimum number of readings have not been taken and stored, the process returns to step 2, at which point the aircraft is positioned in a different heading. The method then continues and repeats as described above for each heading. If the minimum number of readings has been taken, at step 54, a calibration (or error) function or algorithm is generated. As will be appreciated by one skilled in the art, the calibration function may be a function of the heading of the aircraft.

Figure 3:
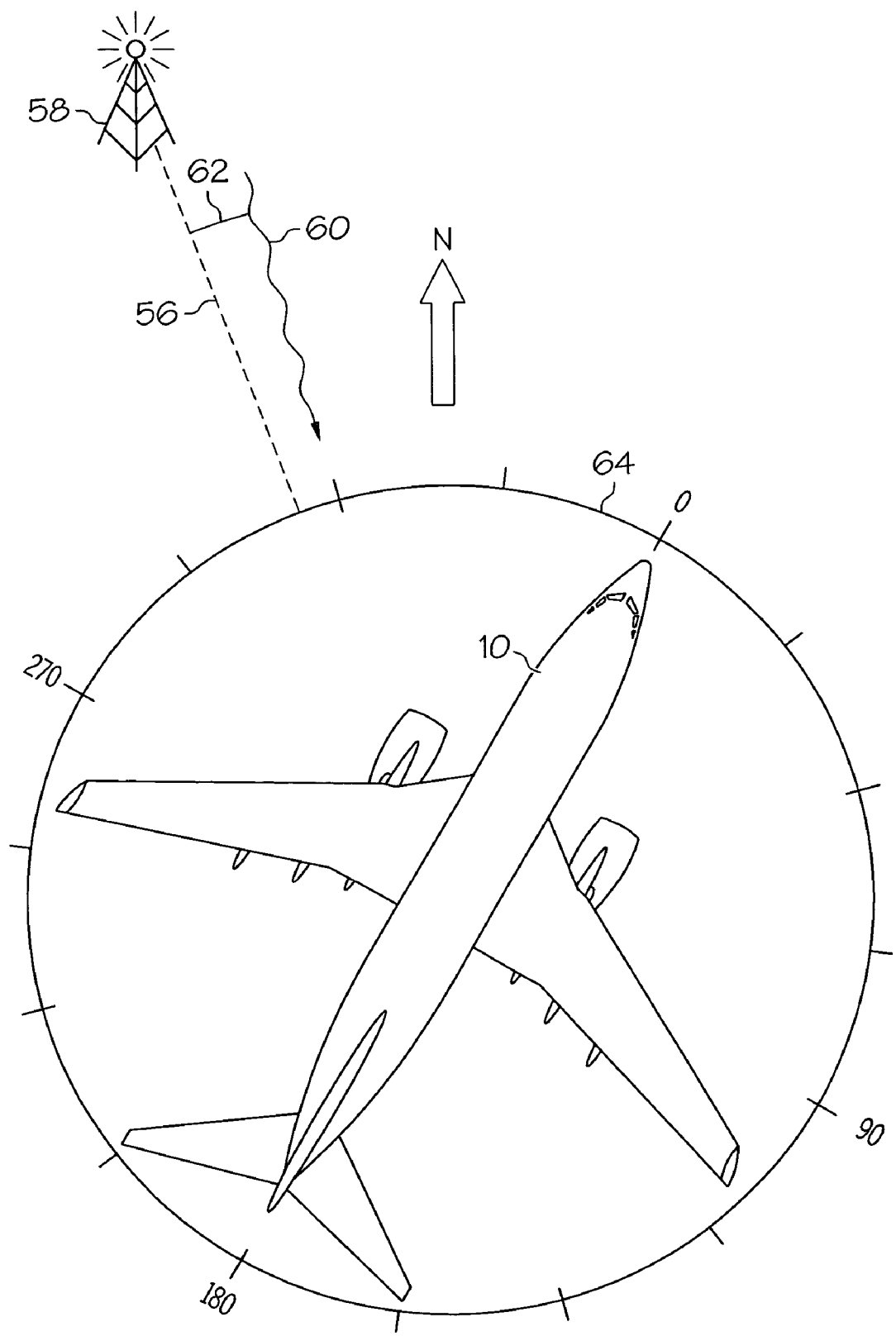
FIGS. 3-5 are top plan schematic views of a system for calibrating on-board aviation equipment utilizing the method illustrated in FIG. 2.
Figure 4:
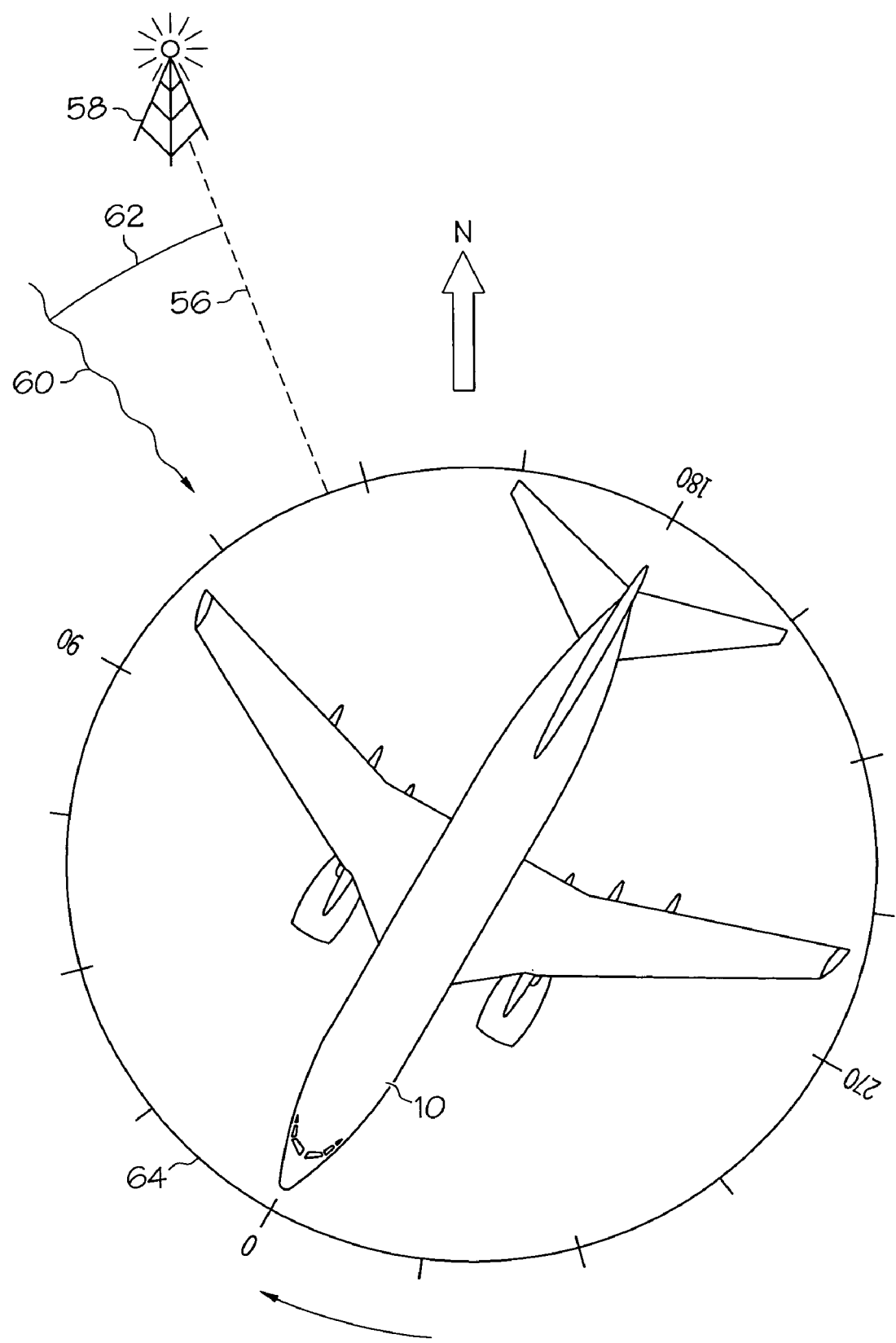
Figure 5:
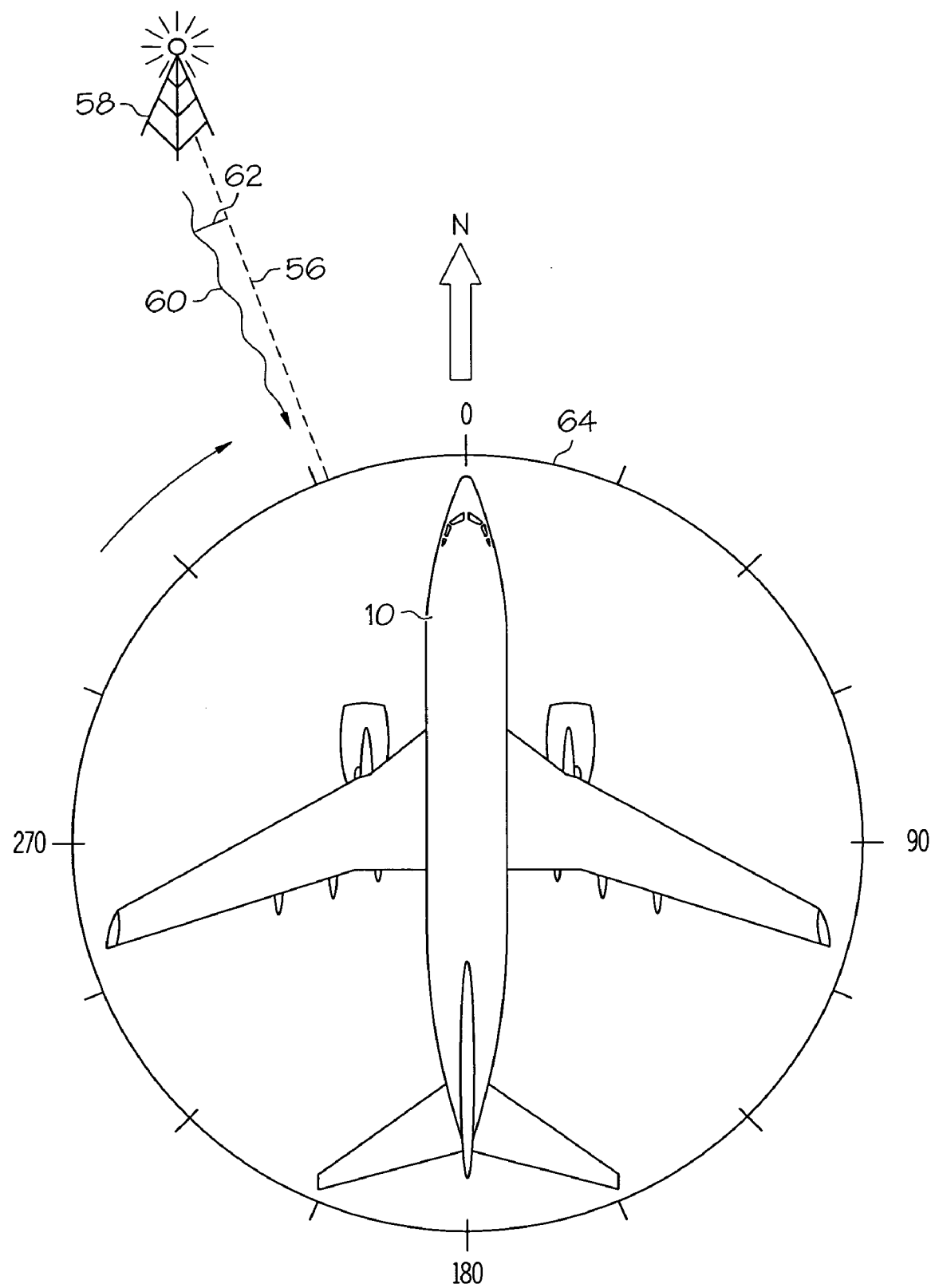

FIGS. 3-5 illustrate the method shown in FIG. 2 in greater detail. As shown in FIG. 3, the aircraft is first directed, or oriented, in a first heading. As described above, the actual bearing 12 from the aircraft 10 to an ADF station 14 is determined. In one embodiment, the actual bearing 12 is determined using the on-board GPS system 32 and the navigation database 34, shown in FIG. 1. The GPS system 32 is used to determine the location (i.e., latitude and longitude) of the aircraft 10, and the navigation database 34 is used to determine the location of the ADF station 58. As will be appreciated by one skilled in the art, modern GPS systems and navigation databases are extremely accurate. Therefore, the system 12 will be able to accurately determine the bearing between the aircraft 10 and the ADF station 58. Therefore, as illustrated in FIGS. 3-5, the actual bearing 56 accurately depicts the bearing from the aircraft 10 to the ADF station 58.

Still referring to FIG. 3, the ADF bearing 60 is then determined by receiving an ADF signal transmitted by the ADF station 58 using the ADF system 36, as is commonly understood. As shown, the actual bearing 56 and the ADF bearing 60 to the ADF station 58 may differ due to various types of error, such as quadrantal error. An angle 62 between the actual bearing 56 and the ADF bearing 60 may represent the ADF error for the particular heading shown in FIG. 3. As shown, both the actual bearing 56 and the ADF bearing 60 lie within the fourth quadrant of a compass rose 64 that indicates the heading of the aircraft 10, and the ADF bearing 60 is slightly more northern than (i.e., lies clockwise from) the actual bearing 56.

FIG. 4 illustrates the aircraft 10 oriented in a second heading while being turned and a second reading is being taken. It should be noted that in the example illustrated in FIGS. 3-5, the aircraft 10 has been rotated but has not changed locations. Thus, the ADF station 58 is located in the same direction relative to the aircraft. The aircraft 10 has been rotated such that the actual bearing 56 to the ADF station 58 and the ADF bearing lie within the second quadrant of the compass rose 64. As illustrated, the ADF bearing 60 has moved relative to the actual bearing 56 and is now counterclockwise of the actual bearing 56. Therefore, the ADF error 62 for the second heading is different than that of the first heading.

FIG. 5 illustrates the aircraft oriented in a third heading while a third reading is being taken. Again the ADF bearing 60 has changed relative to the actual bearing 56, and as a result, the third heading as an ADF error 62 that is different than that for the first and second headings.

The process shown in FIGS. 3-5 may be performed while the aircraft is on the ground. After the system 12 shown in FIG. 1 is set to an "ADF error correction mode" or "ADF calibration mode," a user may manually rotate or turn the aircraft in a complete circle. Using the GPS system 32 along with the compass 38, the system 12 is capable of automatically calculating the starting point and detecting when the aircraft 12 has been turned 360 degrees.

As described above, the process may be repeated numerous times. The system 12 of FIG. 1 may include a minimum number of readings that must be taken in order for the calibration function to be generated. Once the calibration function is generated, during operation of the aircraft 10, the system 12 uses the calibration function to compensate the ADF reading for the ADF error described above so that an accurate ADF bearing is provided to the user, or pilot, of the aircraft.

Other embodiments may not require all of the components illustrated in FIGS. 1 and 2. The process described above can performed without a GPS system with a known starting heading. For example, some airfields have markers on the ground which precisely indicate particular bearings, such as direction (e.g., north) or towards a particular ADF station. The known bearing can be used in place of the actual bearing 56 illustrated in FIGS. 3-5, as will be appreciated by one skilled in the art. The process may also be performed using the GPS system while the aircraft is in flight by simply flying the aircraft in a slow, controlled complete turn during the calibration process.

One advantage of the method and system described above is that there is no need to be able to physically access the ADF antenna. Therefore, the amount of physical labor involved is greatly reduced. Another advantage is that the calibration process may be performed by turning the aircraft only once. As a result, the amount of labor is even further reduced, as is the time required to perform the calibration process. A further advantage is that the accuracy of the calibration process is increased.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method comprising:
   determining a current location of an aircraft using information received from an on-board Global Positioning System (GPS) system;
   retrieving a location of an automatic direction finder (ADF) station from a navigation database;
   determining an actual bearing from the aircraft to the ADF station using the current location of the aircraft determined by the GPS system and the location of the ADF station retrieved from the navigation database;
   moving the aircraft to a plurality of headings;
   determining an ADF bearing from the aircraft to the ADF station at each of the plurality of headings to which the aircraft is moved;
   calculating an error between the actual bearing and each of the determined ADF bearings; and
   generating an error function based at least in part on the calculated errors.

2. The method of claim 1, wherein the actual bearing is alternatively obtained from a ground-based marker.

3. The method of claim 2, wherein said determining of the actual bearing and said determining of the ADF bearing for each respective heading of the aircraft are performed while the aircraft is on the ground.

4. The method of claim 1, wherein the navigation database includes latitude and longitude coordinates for the ADF station.

5. The method of claim 4, wherein at least two of the headings are in different quadrants of a compass.

6. The method of claim 5, wherein the ADF bearing for each respective heading is obtained with an ADF receiver on-board the aircraft that receives a signal transmitted from the ADF station.

7. The method of claim 6, wherein said calculating the error between the actual bearing and the ADF bearing for each respective heading of the aircraft and said generating the error function are performed by a computing system on-board the aircraft.

8. The method of claim 7, further comprising determining the actual bearing for each respective heading of the aircraft.

9. The method of claim 8, wherein said determining of the actual bearing and said determining of the ADF bearing for each respective heading of the aircraft are performed while the aircraft is in flight.

10. A system for calibrating on-board aviation equipment comprising:
    an aircraft; and
    a computing system on-board the aircraft configured to:
       determine a current location of the aircraft using information received from an on-board Global Positioning System (GPS) system;
       retrieve a location of an automatic direction finder (ADF) station from a navigation database;
       determine an actual bearing from the aircraft to the ADF station using the current location of the aircraft determined by the GPS system and the location of the ADF station retrieved from the navigation database;
       calculate error between the actual bearing from the aircraft to the ADF station and a plurality of ADF bearings from the aircraft to the ADF station, each ADF bearing being associated with a respective one of a plurality of headings of the aircraft; and
       generate an ADF error function based at least in part on the calculated error.

11. The system of claim 10, further comprising an ADF receiver on-board the aircraft and in operable communication with the computing system to receive a signal transmitted by the ADF station.

12. The system of claim 11, further comprising a Global Positioning Satellite (GPS) system on-board the aircraft and in operable communication with the computing system and the ADF receiver.

13. The system of claim 12, further comprising a navigation database on-board the aircraft and in operable communication with the computing system, the ADF receiver, and the GPS system, the navigation database including latitude and longitude coordinates for the ADF station.

14. The system of claim 13, wherein the computing system is further configured to determine the actual bearing using the GPS system and the navigation database.

15. The system of claim 14, wherein the computing system is further configured to determine the ADF bearings using the signal received from the ADF receiver.

16. The system of claim 15, further comprising a compass on-board the aircraft and in operable communication with the computing system.

17. A system for calibrating an automatic direction finder (ADF) receiver comprising:
    an aircraft;
    an ADF receiver on-board the aircraft to receive a signal transmitted from an ADF station; and
    a computing system on-board the aircraft and in operable communication with the ADF receiver, the computing system configured to:
       determine a current location of the aircraft using information received from an on-board Global Positioning System (GPS) system;
       retrieve a location of the ADF station from a navigation database;
       determine an actual bearing from the aircraft to the ADF station using the current location of the aircraft determined by the GPS system and the location of the ADF station retrieved from the navigation database;
       determine an ADF bearing from the aircraft to the ADF station for each of a plurality of headings of the aircraft using the ADF receiver;
       calculate an error between the actual bearing and the ADF bearing for each of the plurality of headings; and
       generate an ADF error function based at least in part on the calculated errors.

18. The system of claim 17, further comprising a Global Positioning Satellite (GPS) system and a navigation database on-board the aircraft and in operable communication with the computing system and the ADF receiver.

19. The system of claim 18, wherein the computing system is further configured to determine the actual bearing using the GPS system and the navigation database.

20. The system of claim 19, wherein the computing system is further configured to determine the ADF bearings using the signal received from the ADF receiver.

* * * * *